H. J. & A. J. SCHEPP.
HOISTING APPARATUS FOR CERTAIN FARM IMPLEMENTS.
APPLICATION FILED SEPT. 27, 1911.
1,108,797.
Patented Aug. 25, 1914.
3 SHEETS—SHEET 1.
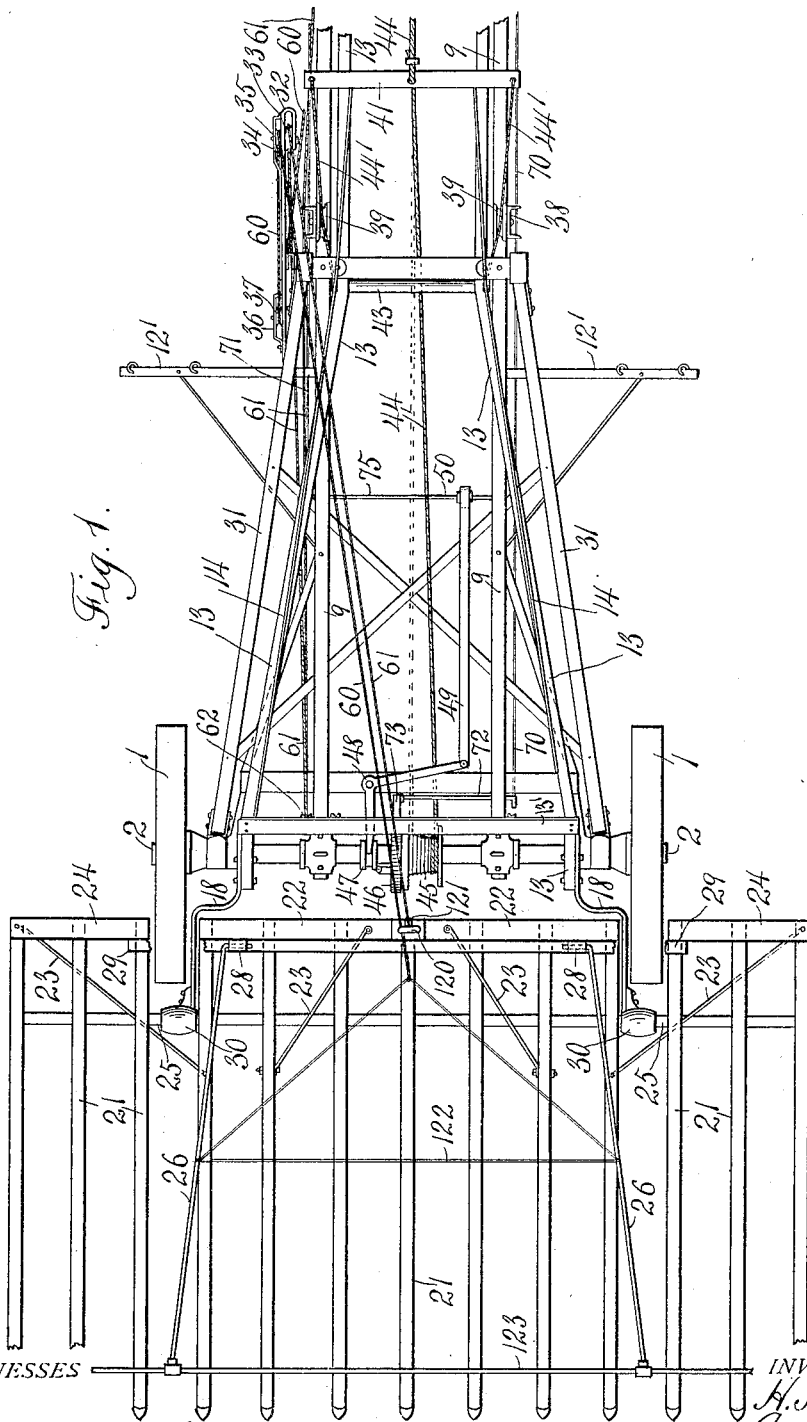

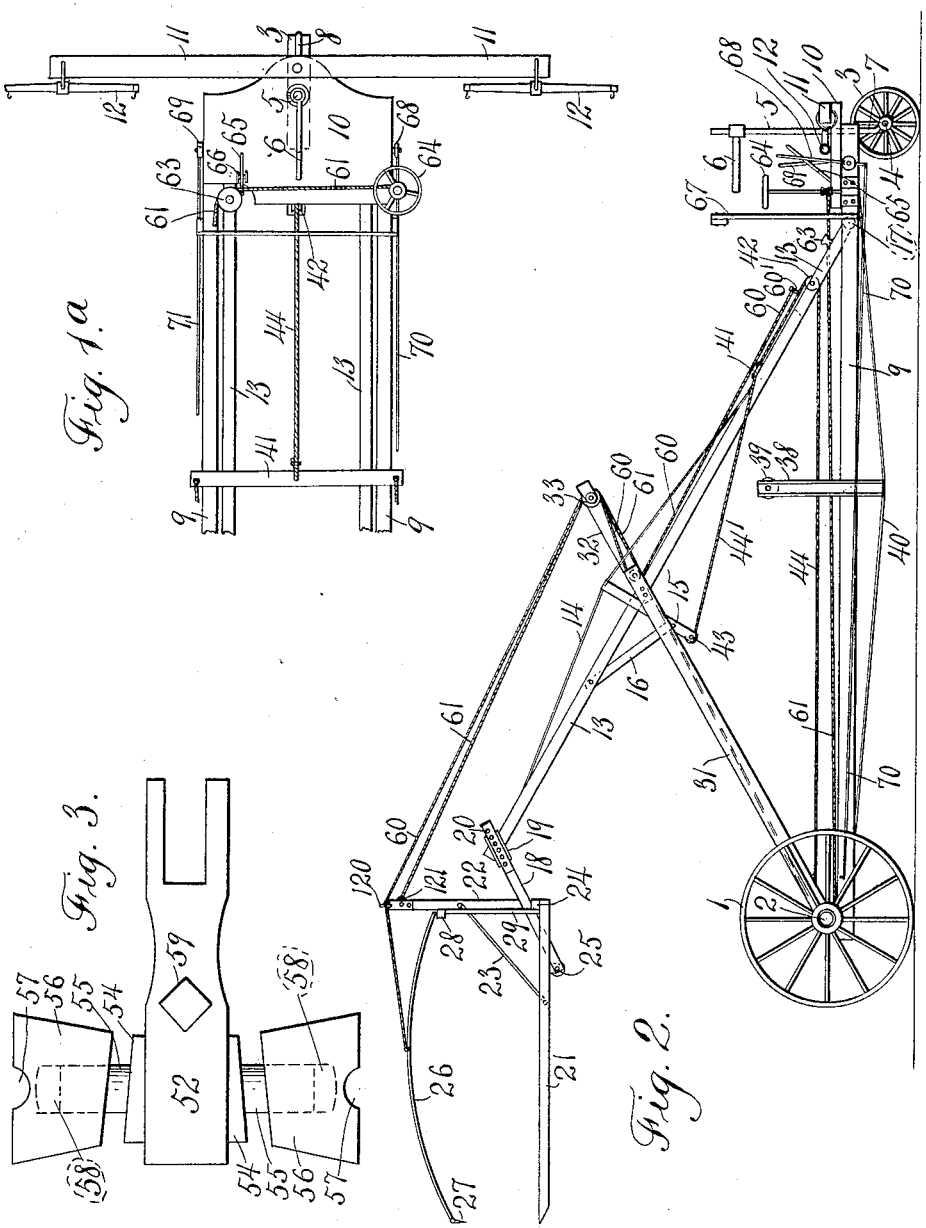

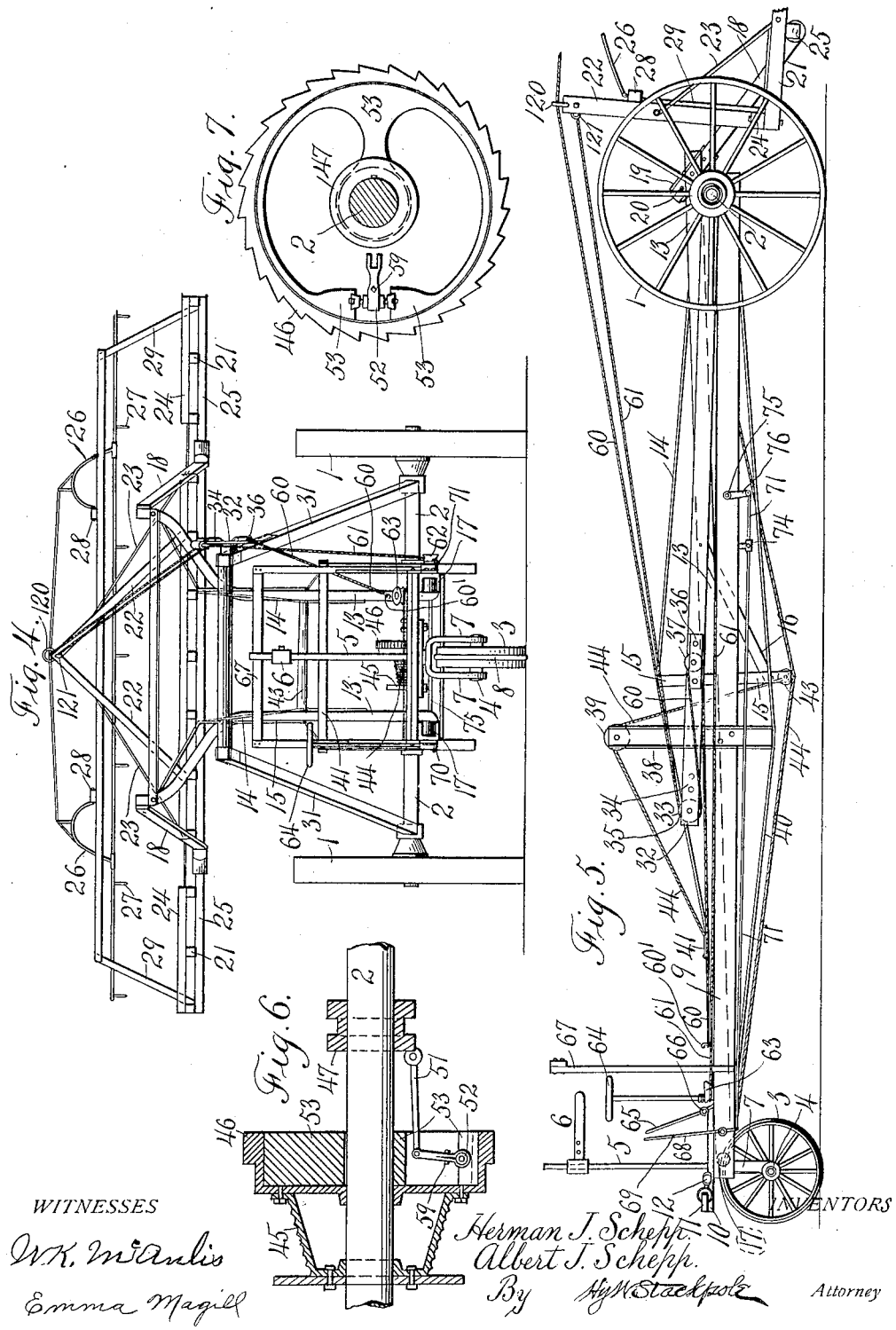

UNITED STATES PATENT OFFICE.

HERMAN J. SCHEPP AND ALBERT J. SCHEPP, OF NEAR MANHATTAN, KANSAS.

HOISTING APPARATUS FOR CERTAIN FARM IMPLEMENTS.

1,108,797.

Specification of Letters Patent. Patented Aug. 25, 1914.

Application filed September 27, 1911. Serial No. 651,557.

*To all whom it may concern:*

Be it known that we, HERMAN J. SCHEPP and ALBERT J. SCHEPP, citizens of the United States, residing near Manhattan, in the county of Riley and State of Kansas, have invented certain new and useful Improvements in Hoisting Apparatus for Certain Farm Implements, of which the following is a specification.

Our invention relates to improvements in hoisting apparatus adapted to interchangeably elevate numerous appliances required in their operation to be hoisted or raised and lowered to facilitate their use and the accomplishment of the objects desired thereby and while designed principally for use with and reference to farm implements and tools, may, with equal facility, be used in connection with numerous other tools and devices; one of the principal objects being to provide a hoisting apparatus which, when being transported or not in use, may be readily placed in a compact form on the running gear; thereby avoiding inconvenience and danger incident to stationary elevated standards or derricks likely to come in contact with overhanging objects, as also the racking and danger of toppling over; thus, also, admitting of a narrow tread and frame so as to readily pass through the ordinary farm gateway or opening. We attain these objects by the mechanism illustrated in the accompanying drawings in which—

Figure 1 is a plan view of our improved apparatus with hay rake and loader attachment and with the rear running gear severed; Fig. 1ª, a plan view of that portion of the rear gear not shown in Fig. 1; Fig. 2, a side elevation of the completed machine shown in Figs. 1 and 1ª; Fig. 3, an enlarged detail view of the locking device for the clutch shown in Fig. 7; Fig. 4, a rear perspective view of the machine shown in Figs. 1 and 1ª; Fig. 5, a side elevation of our apparatus lowered for transportation; Fig. 6, a cross sectional view of the hoisting drum; Fig. 7, a detail view of the friction clutch for controlling the hoisting drum.

In Figs. 1 to 7 we have shown our improved hoisting apparatus in connection with a machine operated hay fork or rack. In these figures 1 are fore, or main supporting wheels mounted on the ends of axle 2 and furnishing traction for the operation of the hoisting apparatus. 3 is a rear auxiliary supporting and apparatus steering caster wheel rotating on short axle 4, and governed in its direction through the vertical rod 5 by a tiller steering handle 6, the caster wheel being preferably mounted in forks 7 on the lower end of the rod and integral or rigidly secured thereto. To facilitate steering and prevent skidding the caster wheel is provided with a rib 8. Side reaches 9, preferably of channel iron, are bracketed at the fore end to axle 2 and held in spaced relation at the rear end by a platform 10 bolted thereto, the platform also serving as a steady bearing for the caster wheel mounting, and having secured thereto cross bar 11 carrying single trees 12 which coöperate with side hitches 12′ in furnishing means for the attachment of draft animals, the animals pulling the running gear forward through the single trees and backward through the side hitches 12′. A forwardly rising hoisting frame 13, stiffened by brace 13′, and trussed by rods 14 extending over cross pieces 15, which are further braced by strips 16, is mounted on the running gear with its rear end lying between the reaches 9, anti-friction rollers 17 mounted on the end of the frame resting in the grooves of the reaches and guiding said rear end. At the forward end of the hoisting frame 13 is a pair of supporting arms 18 steadied in short channel brackets 19, a series of holes 20 providing relative adjustment between the arms and brackets. At the forward ends of these arms 18 is pivoted in the structure illustrated in Figs. 1 to 7 particularly, a hay fork or rack comprising a series of forwarding extending teeth 21, and a truss 22, to which the teeth are rigidly connected by braces 23, cross strip 24 and cross strip 25, the cross strip 25 being pivoted in bearings 30 which are connected to the fore ends of the arms 18. An overlying frame 26 having depending points 27 is pivoted at 28 to a piece 22′ bolted to the truss 22, and also to the end braces 29 which are attached to the cross strip 24. A rearwardly rising truss 31, pivotally mounted on the axle 2 by means of a boxing 31′ at its forward ends and pivotally connected near its other end to the frame 13, by means of a cross bar 15′, carries at its rear or rising end a rearwardly extending pulley-carrying bracket 32 in which is mounted pulley 33 and to one side of which is secured a smaller bracket 34 carrying a pulley 35 and another smaller bracket 36 carrying a pulley 37. About midway and on the outer side of each of the reaches 9 is secured a perpendicular post 38, carrying at its upper end a pulley 39, and steadied at its lower end by a truss-rod 40. 41 designates an evener bar which extends across the frame 13 and is adapted to slide freely thereon. From each end of the evener bar 41 extends a short cable 44′ to an eye 43, formed at the lower end of each of the cross-pieces 15. Mounted upon the frame 13 near its rear end is a pulley 42, and a hoisting cable 44 is secured to the middle of the evener bar 41 and passes around the pulley 42, from whence it extends forwardly to a winding drum 45 mounted upon the axle 2.

As clearly shown in Fig. 5, the hoisting frame 13 when in idle position rests substantially upon the reaches 9, and in such position the short cables 44′ rest in the pulleys 39 and are supported thereby. It will be observed that the pulleys 39 are located considerably above the plane of the reaches 9, and that the eyes 43 lie considerably below such plane. Extending between these eyes is a bar or roller 43′ (see Fig. 1) which, with the parts in the position shown in Fig. 5, rests upon the cable 44 and maintains it taut. When the winding drum is caused to revolve by the turning of the axle 2, during the forward movement of the machine, the cable 44 is wound up, this cable, in turn, exerting tension upon the short cables 44′. The tension produced by the winding drum causes that portion of the cable 44, seen below the reaches in Fig. 5, to straighten, and in so doing, to bear upward against the bar 43′ and thus impart an initial lifting movement to the hoisting frame. This frame is also lifted by the direct upward pull of the short cables 44′, and it is obvious that such lifting action will continue until the eyes 43 have moved upward to a point level with the pulleys 39. During such direct lifting action, the pulley 42 serves practically as a fixed abutment. When the frame has been hoisted to a position in which the eyes 43 are level with the pulleys 39, this direct lifting action ceases, and upon further winding of the drum, the tension of the cable 44, which has now ceased to run over pulley 42, causes the rear end of the hoisting frame to travel forwardly along the reaches 9, thus lifting the cables 44′ clear of the pulleys 39, as illustrated in Fig. 2.

A hollow shell ratchet 46 is secured fast to the winding drum and a friction clutch operated through slide 47, bell crank lever 48 and rod 49 having eccentric connection 50, controls the return movement of the winding drum. The clutch shown in detail in Figs. 3, 6 and 7, comprises a rod 51 operating a split expanding lever 52, which causes an inner split expanding rim 53 to clutch the inside of the hollow shell bearing the ratchet 46, through the wedging action of the expanding block 54, mounted on the rockshaft 55, and the expanding blocks 56, the latter being provided with recesses 57 into which the ends of the split expanding rim 53 fit and are secured by lag bolts. The split expanding lever is tightened on the expanding block 54 by a bolt 59. A cable 60, extending from the overhanging frame 26 on the hay fork, passes through an eye 120 on the top of the truss 22, over pulley 35, over pulley 37 and to a hook 60′ near the rear end of the frame 13. This cable controls the rising and falling of the overhanging frame 26. A trip cable 61 extending from an eye 121 on the truss 22 of the rack, passes over pulley 33, over pulley 62 on one side near the forward end of one of the reaches 9, thence rearward past a pulley 63 near the rear end of the hoisting frame 13, and across the front end of the platform 10 to a vertical winding shaft mounted in a bracket on the outside of one of the reaches 9 at that point, and operated by a hand wheel 64. The passage of the cable back and forth is controlled by a clutch operated by a hand lever 65 mounted in bracket 66 on the platform. 67 is a guard mounted just forward of the platform 10 the uprights of the guard being bolted to the uprights of the reaches 9. 68 is a ratchet controlling lever and 69 a clutch controlling lever mounted on opposite sides of the platform or pivoted on the reaches 9. The former is connected to forwardly extending rod 70 and the latter to forwardly extending rod 71, the former rod 70 releasing the ratchet through the lever 72 and pawl 73 and the latter rod 71 operating the clutch through oscillating shaft 75 and eccentric 50, crank arm 76 giving the necessary leverage. The rod 71 may be shortened and trip 74 used.

In operation, the vehicle being propelled forward by the draft animals, hay or other matter desired to be collected is gathered by the teeth of the hay fork to the amount desired for a load. The clutch 47 is then operated by lever 71, whereupon the continued movement of the wheels 1 and axle 2 cause a winding of the cable 44 on the drum 45, causing the rear end of frame 13 to move slowly forward, the anti-friction rollers 17 moving forward in their guides in reaches 9, the forward end of the frame 13 being forced upward as described and carrying the hay fork upward without tipping. The automatic frame 26 drops on the load. When the hay fork has reached the desired height, the clutch 47 is released by lever 69 and the load ceases to rise, the ratchet 46 preventing the return of the drum and release of the cable 44, and holding the load suspended. A vehicle being driven under the fork, the cable 61 is released by operating clutch 65, the fork tips and the load is discharged. The ratchet 46 is then released from the pawl 73 by operating the lever 68. The hoisting frame 13 and the truss 31 then lower until the fork is again near the ground, the cable 61 meanwhile being gathered in. In this position the rollers 39 on the side posts 38 support the cable 44' and the cable 44 supports the roller 43. By preserving the tautness of these cables with pawl 73 and ratchet 46, the rack can be suspended at the desired distance above ground for collecting a load, which is gathered as the machine moves forward again. When the load is completed the lever 69 operates the clutch 47 and the load rises as before on the continued forward movement of the running gear. The running gear and hoisting apparatus may be used with various other attachments in place of the hay fork with slight changes in which all or only a part of the hoisting apparatus is used.

Having thus described our invention the following is what we claim as new therein and desire to secure by Letters Patent:

1. In a device of the class described, the combination with a frame comprising spaced grooved reaches, of a hoisting frame having at the rear end projections adapted to slide in such grooves, a brace member pivoted to and coacting with said hoisting frame to produce a rising support, a pulley carried by said first frame above the plane thereof, and at a point near the center of such frame, a second pulley mounted at the rear end of said hoisting frame, and a flexible connection secured to said hoisting frame adjacent the pivotal point of said brace member, passing upwardly over said first pulley, and thence around said second pulley and parallel with said reaches, whereby, when tension is exerted thereon, a positive lifting force is applied to the point of pivotal connection between said hoisting frame and brace member, and said frame thus caused to rise.

2. In a device of the class described, the combination with a frame comprising spaced grooved reaches, of a hoisting frame having at one end projections adapted to slide in said grooves, and also having a pulley mounted thereon adjacent such end, a pivoted member co-acting with such frame to produce a rising support, a pair of pulleys carried by said first frame intermediate its ends and disposed, one at each side of the frame and above the plane thereof, a pair of cables passing over said last named pulleys and attached at one end to said hoisting frame near its center, an evener bar to which the other ends of said cables are attached, and a third cable attached to the middle of said evener bar, passing around said first named pulley, and thence parallel with said reaches, whereby when tension is exerted upon such cable, the hoisting frame is first lifted till it reaches the level of said pair of pulleys, and the lower end thereof is then caused to travel along said reaches in the direction of the tension.

3. In a device of the class described, the combination with a frame comprising spaced grooved reaches, of a hoisting frame having at one end projections adapted to slide in such grooves, a brace member pivoted to and co-acting with said hoisting frame to produce a rising support, a pulley carried by said first frame above the plane thereof, a strut secured to the hoisting frame adjacent the pivotal connection with said brace member and extending transversely of the plane thereof, and a hoisting cable attached to the lower end of said strut and passing up over said pulley, whereby, when tension is exerted upon said cable, said hoisting frame will be lifted until the lower end of said strut reaches the level of said pulley.

4. In a device of the class described, the combination with a frame comprising spaced grooved reaches, of a hoisting frame having at one end projections adapted to slide in said grooves, and also having a pulley mounted thereon adjacent such end, a pivoted member co-acting with such frame to produce a rising support, a pair of struts carried by said hoisting frame near its center, disposed one at each side of said frame and extending downwardly transversely of the plane thereof, a bar connecting the lower ends of said struts, a pair of pulleys carried by said first frame intermediate its ends and above the plane thereof, a pair of cables passing over said last named pulleys, one end of each of said cables being attached to the lower end of one of said struts, an evener bar to which the other ends of said cables are attached, and a third cable attached to the middle of said evener bar, passing around said first named pulley, and thence parallel with said reaches, said bar being arranged to rest upon said cable when said hoisting frame is in its lowermost position, whereby, when tension is exerted on such cable, the hoisting frame is initially lifted jointly by the pull on said pair of cables, and by the upward thrust of said third cable on said bar.

In witness whereof, we have hereunto affixed our signatures in the presence of two subscribing witnesses.

HERMAN J. SCHEPP.
ALBERT J. SCHEPP.

Witnesses:
J. J. BRITSCHGE,
MAY H. ALLINGHAM.